Feb. 10, 1931. R. STRESAU 1,792,196
METHOD OF AFFIXING KEYS IN TUBULAR SHAFTS
Filed May 15, 1929
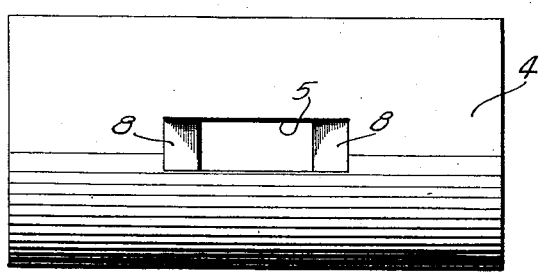
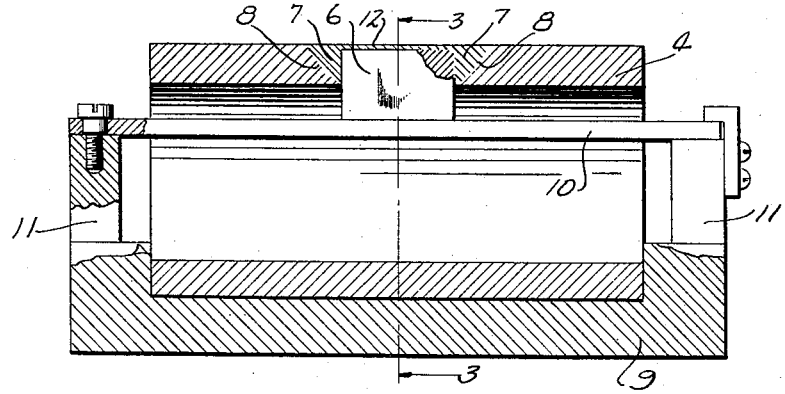
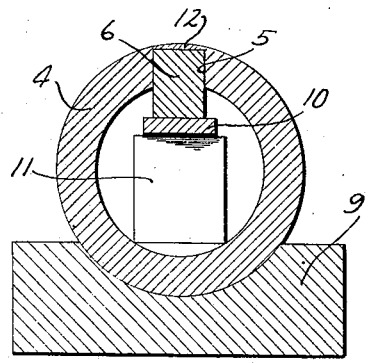
Inventor
Richard Stresau
By
Marles & French
Attorneys Patented Feb. 10, 1931

1,792,196

UNITED STATES PATENT OFFICE

RICHARD STRESAU, OF WAUWATOSA, WISCONSIN, ASSIGNOR TO SWIFTON MANUFACTURING COMPANY, OF WEST ALLIS, WISCONSIN, A CORPORATION OF WISCONSIN

METHOD OF AFFIXING KEYS IN TUBULAR SHAFTS

Application filed May 15, 1929. Serial No. 363,274.

The invention relates to a method of affixing keys in tubular shafts.

Heretofore the setting of a key in a tubular shaft was a difficult, expensive and laborious undertaking, requiring careful machine work and hand fitting and, if firmly affixed, necessitating the use of special fastening means. The object of the present invention is to provide a method of affixing keys in tubular shafts by simple milling and welding steps that may be quickly and cheaply performed and that will firmly hold the key in place.

The invention further consists in the method hereinafter described and more particularly defined by claims at the conclusion hereof.

In the drawings Fig. 1 is a plan view of a piece of shafting after undergoing the first step of the method involving the invention;

Fig. 2 is a vertical sectional view through the completed work;

Fig. 3 is a detail sectional view taken on the line 3—3 of Fig. 2.

The method embodying the invention consists in milling a slot in the shaft to be treated of the width and approximate length of the key to be inserted, inserting the key in the slot to the desired depth and welding the ends of the key to the ends of the milled slot.

As an illustration, in the drawings the numeral 4 designates a piece of tubular shafting and 5 the slot milled therein, 6 the key, whose width is about equal to the width of the slot so as to tightly fit therein, 7 the welding material that is deposited in the ends 8 of the milled slot in welded association with the ends of the key and the slot.

It will be noted that where the slot 5 is milled in the part 4 with the usual milling cutter that the end 8 of this slot will be curved or inclined.

During the welding operation the work is supported in any suitable work support 9 and the extent the key projects beyond the inner wall of the tube or shaft is controlled by a stop bar 10 which is here shown as supported on uprights 11 resting on or secured to the support 9.

From Fig. 2 it will be noted that the welding metal extends at 12 over the top of the key, which assists in firmly anchoring the same, but the upper edge of the key may be flush with the outer wall of the tube and the welding metal deposited only at the ends. After welding the rough surfaces are readily and quickly removed by grinding.

What I claim as my invention is:

1. The method of affixing a key in a tubular member which consists in forming a slot with inclined ends in said member of the width of the key, and of a length slightly greater than the length of the key, so as to leave small cavities between the ends of the key and the inclined ends of the slot, inserting a key in said slot and retaining it therein in the desired protected position, and securing the ends of the key to the ends of said slot by welding material deposited in said cavities.

2. The method of affixing a key in a tubular member which consists in milling a curved ended slot in the member of the width of the key and of a length slightly greater than the length of the key so as to leave small cavities between the ends of the key and the curved ends of the slot, inserting a key in said slot and retaining it therein in the desired projected position, and securing the ends of the key to the ends of said slot by welding material deposited in said cavities.

3. The method of affixing a key in a tubular member which consists in milling a curved ended slot in the member of the width of the key and of a length slightly greater than the length of the key so as to leave small cavities between the ends of the key and the curved ends of the slot, inserting a key in said slot with its top slightly below the outer surface of said tubular member and its bottom edge projecting to the desired extent and retained in this position, and securing the key to said member by welding material deposited in said end cavities and along the top of the key.

In testimony whereof, I affix my signature.

RICHARD STRESAU.

CERTIFICATE OF CORRECTION.

Patent No. 1,792,196.                      Granted February 10, 1931, to

RICHARD STRESAU.

It is hereby certified that error appears in the printed specification of the above numbered patent requiring correction as follows: Page 1, line 67, claim 1, for the word "protected" read projected; and that the said Letters Patent should be read with this correction therein that the same may conform to the record of the case in the Patent Office.

Signed and sealed this 24th day of March, A. D. 1931.

(Seal)                                              M. J. Moore,
                                                       Acting Commissioner of Patents.